(12) United States Patent
Lin

(10) Patent No.: US 7,412,743 B2
(45) Date of Patent: Aug. 19, 2008

(54) WIPER FOR AN AUTOMOBILE REAR-VIEW MIRROR

(76) Inventor: Chiang-Fen Lin, No. 3, Alley 40, Lane 112, Nansing Road, Yongkang City, Tainan County (TW)

( * ) Notice: Subject to any disclaimer, the term of this patent is extended or adjusted under 35 U.S.C. 154(b) by 82 days.

(21) Appl. No.: 11/499,740

(22) Filed: Aug. 7, 2006

(65) Prior Publication Data

US 2008/0028562 A1    Feb. 7, 2008

(51) Int. Cl.
- *B60S 1/60* (2006.01)
- *B60S 1/26* (2006.01)
- *B60S 1/34* (2006.01)

(52) U.S. Cl. ................. 15/250.003; 15/250.3

(58) Field of Classification Search ........... 15/250.003, 15/250.002, 250.3, 250.43, 250.351, 250.34, 15/250.48, 250.23, 250.21; 74/42, 43, 425; 464/39; 192/138

See application file for complete search history.

(56) References Cited

U.S. PATENT DOCUMENTS

| | | | | |
|---|---|---|---|---|
| 2,944,277 A | * | 7/1960 | Ochello | 15/250.3 |
| 3,051,516 A | * | 8/1962 | Ryck | 403/78 |
| 3,447,187 A | * | 6/1969 | Barrett | 15/250.16 |
| 4,435,875 A | * | 3/1984 | Hauk | 15/250.23 |
| 4,466,712 A | * | 8/1984 | Vitaloni | 359/507 |
| 2006/0117514 A1 | * | 6/2006 | Yagi et al. | 15/250.3 |

FOREIGN PATENT DOCUMENTS

| | | | |
|---|---|---|---|
| FR | 2617781 | * | 1/1989 |
| JP | 57-95239 | * | 6/1982 |
| JP | 57-209448 | * | 12/1982 |

* cited by examiner

*Primary Examiner*—Gary K Graham (57) ABSTRACT

A wiper for an automobile rear-view mirror includes a wiper transmission device installed at the rear side of a rear-view mirror. The wiper transmission device is provided with a transmission motor having a driving gear extending outward to be engaged with a speed-change gear unit for driving a driven gear to rotate. The driven gear is provided with a rotating shaft inserted through the front surface of the rear-view mirror, and the rotating shaft has its outer end fixed with a connecting rod having a wiper fitted thereon. When the transmission motor is started, the wiper can be driven to sway upward or downward for wiping out water drops on the surface of the rear-view mirror to keep the mirror surface clear to enable a driver to clearly watch the traffic conditions reflected in the rear-view mirror and drive with safety.

5 Claims, 7 Drawing Sheets

WIPER FOR AN AUTOMOBILE REAR-VIEW MIRROR

BACKGROUND OF THE INVENTION

1. Field of the Invention

This invention relates to a wiper for an automobile rear-view mirror, particularly to one able to wipe out water drops on the surface of a rear-view mirror of an automobile to enable a driver to clearly watch the traffic conditions reflected in the rear-view mirror and drive with safety.

2. Description of the Prior Art

As commonly known, it is important for a driver to watch the moving conditions of the automobiles coming from behind through the left and the right rear-view mirror before making a turn, overtaking a car, changing lanes or parking. However, the rear-view mirrors of an automobile are respectively disposed at the opposite outer sides of an automobile; therefore, in raining days, rain water will remain on the surfaces of the rear-view mirrors to disable the rear-view mirrors to reflect images clearly. As a result, the driver of an automobile cannot clearly watch the moving conditions of the automobiles coming from behind, thus hardly able to drive safely.

SUMMARY OF THE INVENTION

The objective of the invention is to offer a wiper for an automobile rear-view mirror, able to wiper out water drops on the surface of a rear-view mirror of an automobile so as to enable a driver to clearly watch the traffic conditions reflected in the rear-view mirror and insure driving safety.

The wiper for an automobile rear-view mirror in the present invention includes a wiper transmission device installed at the rear side of a rear-view mirror. The wiper transmission device is provided with a transmission motor fixed thereon with a driving gear extending outward to be engaged with a speed-change gear unit for driving a driven gear to rotate. The driven gear is disposed with a rotating shaft inserted through the front surface of the rear-view mirror, and the rotating shaft of the driven gear has its outer end connected with a connecting rod having a wiper fitted thereon. By so designing, when the transmission motor is started, the wiper, through interaction of the speed-change gear unit and the driven gear, can be driven to sway and wipe out water drops on the surface of the rear-view mirror.

BRIEF DESCRIPTION OF DRAWINGS

This invention will be better understood by referring to the accompanying drawings, wherein.

DETAILED DESCRIPTION OF THE PREFERRED EMBODIMENT

A preferred embodiment of a wiper for an automobile rear-view mirror in the present invention, as shown in FIGS. 1-4, includes a rear-view mirror 1, a wiper transmission device 2, a connecting rod 3, a wiper 4 and a positioning member 5 as main components combined together.

Figure 1:
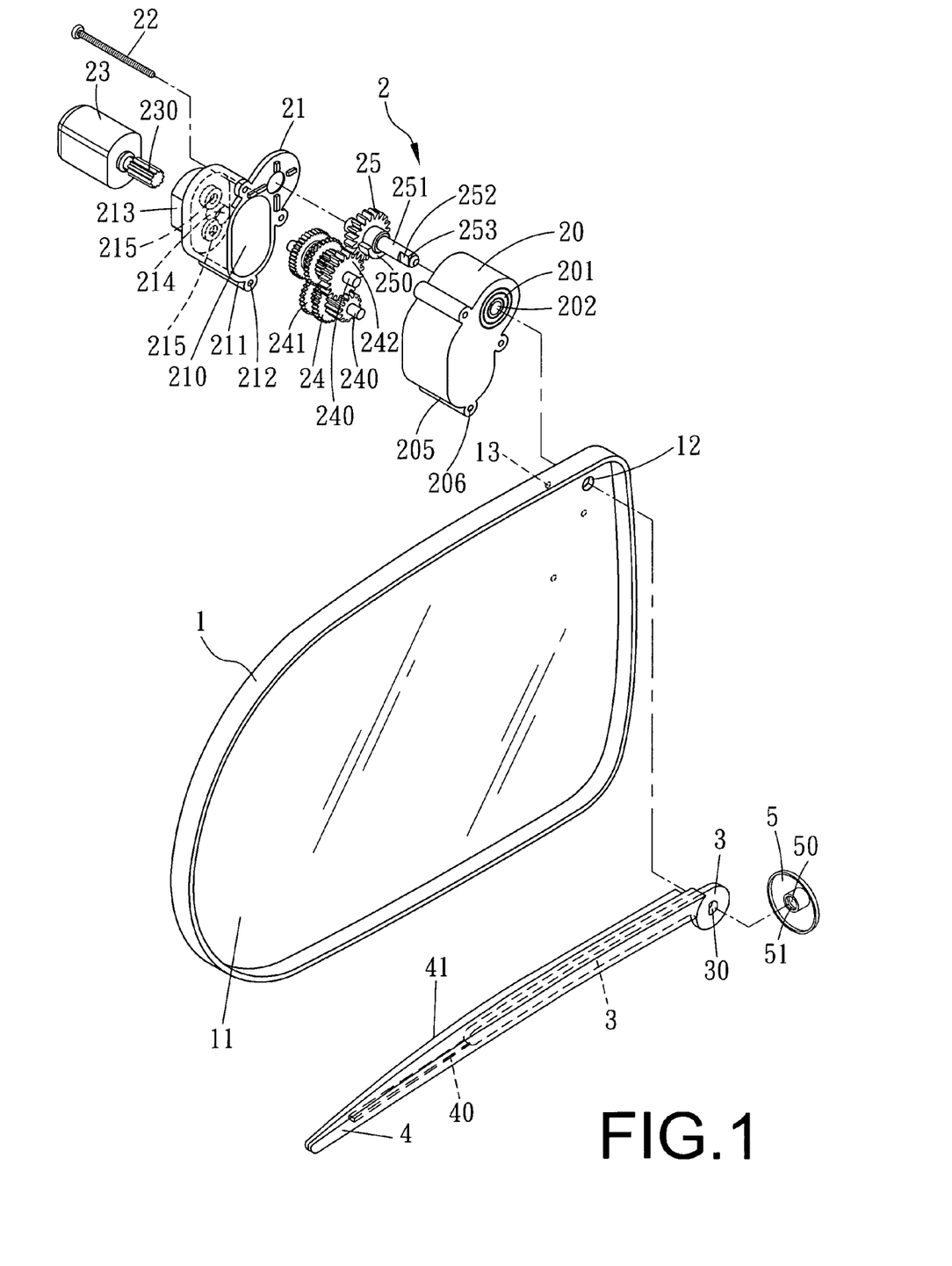
FIG. 1 is an exploded perspective view of a wiper for an automobile rear-view mirror in the present invention.

The rear-view mirror 1 has its front side provided with a mirror surface 11 provided with one upper corner bored with an insert hole 12 extending through the rear side of the rear-view mirror 1, and its rear side bored with a plurality of threaded holes 13.

Figure 2:
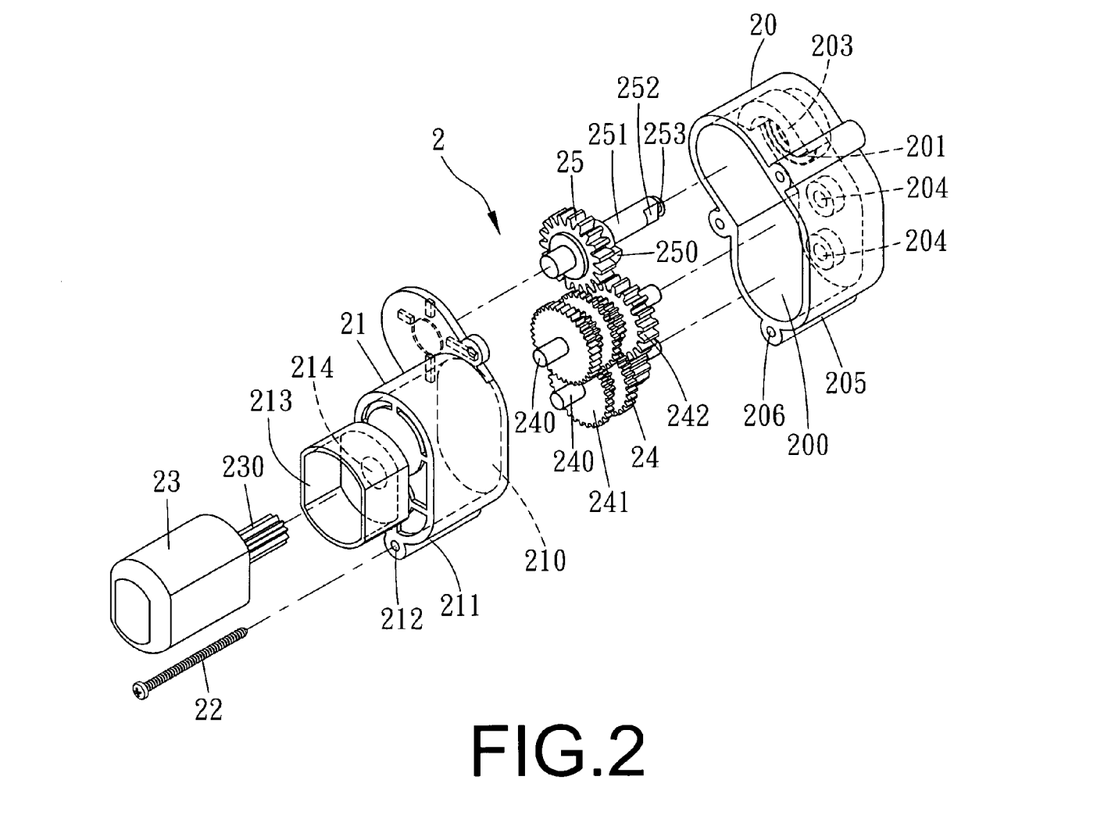
FIG. 2 is an exploded perspective view of a wiper transmission device in the present invention.
Figure 3:
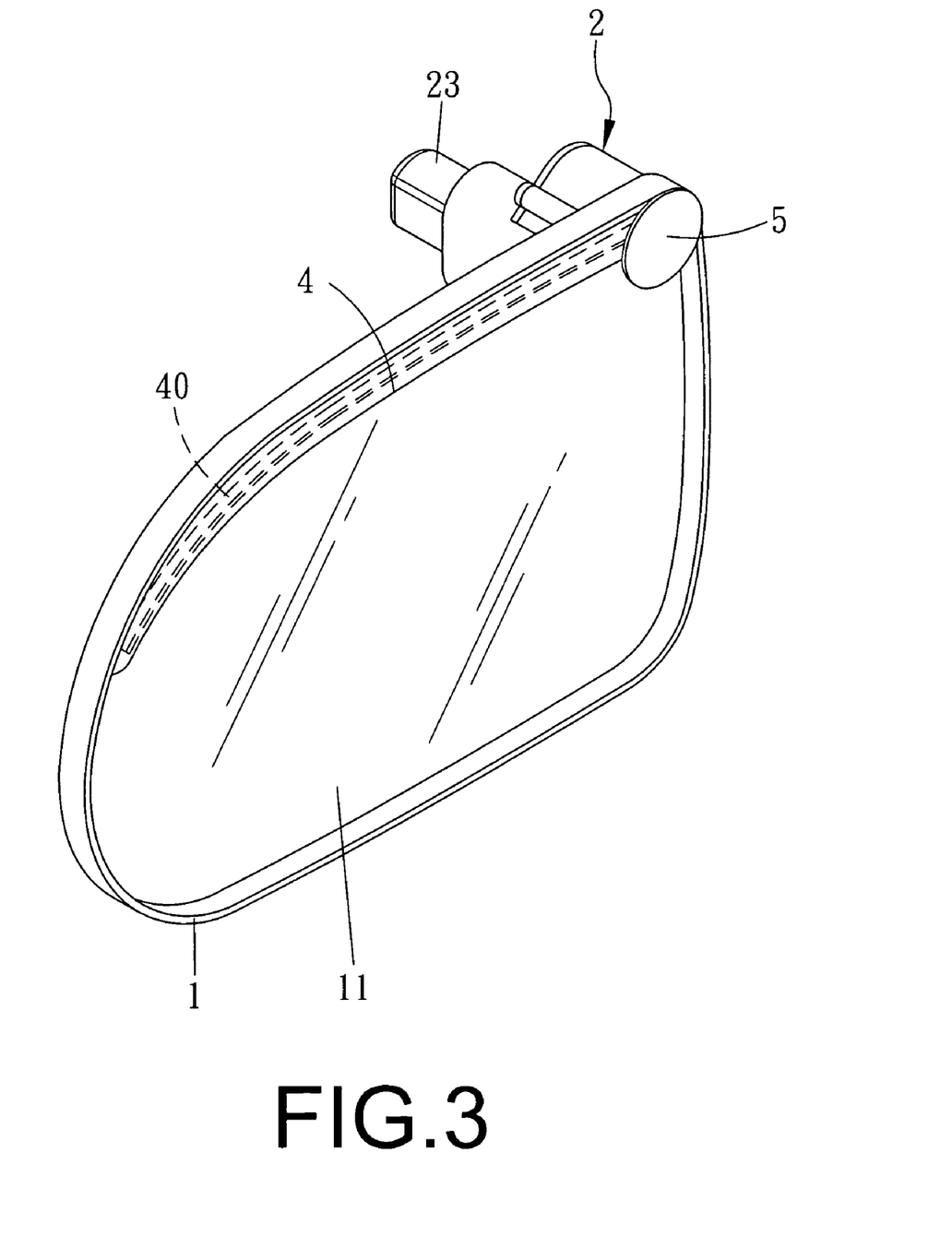
FIG. 3 is a perspective view of the wiper for an automobile rear-view mirror in the present invention.
Figure 4:
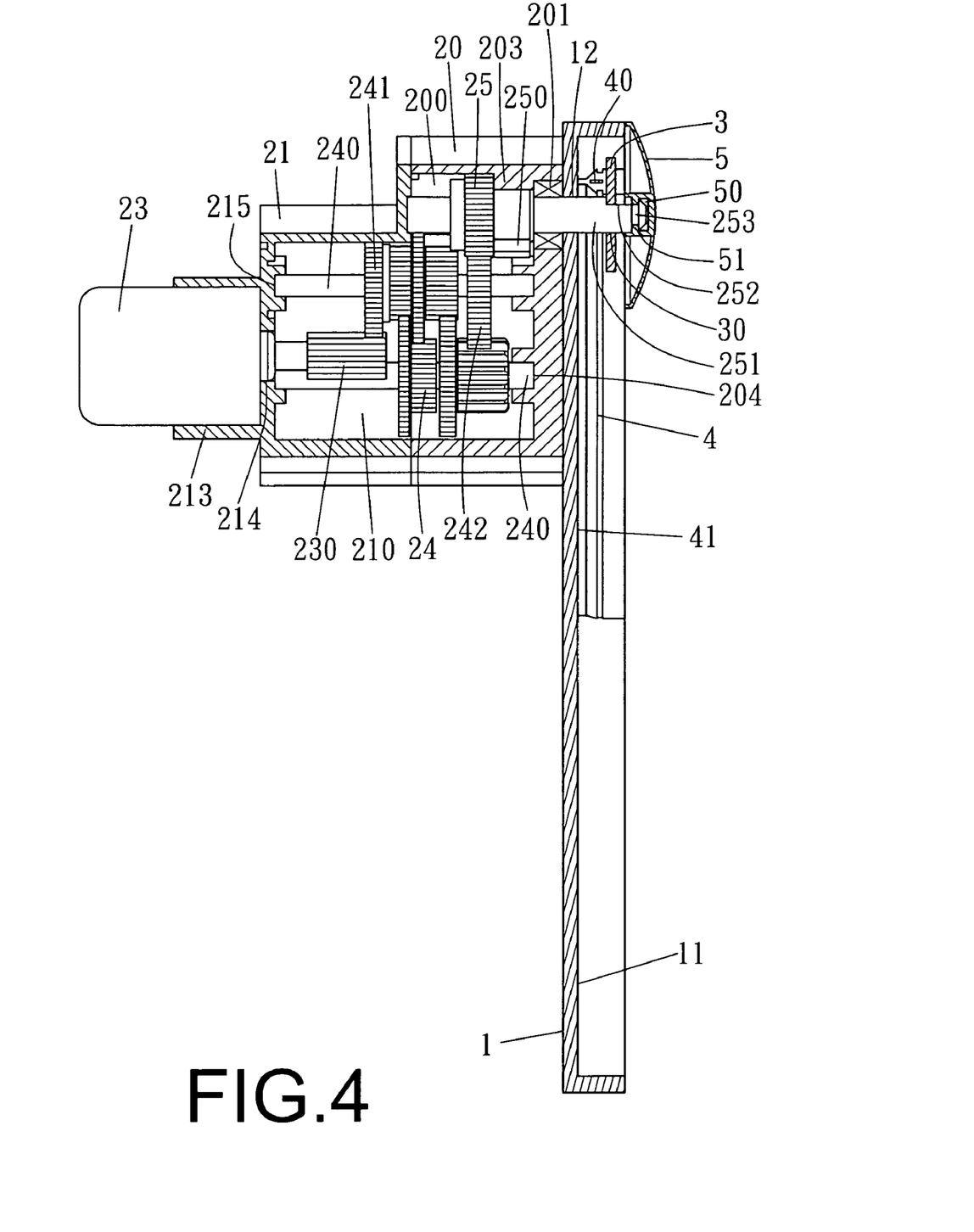
FIG. 4 is a side cross-sectional view of the wiper for an automobile rear-view mirror in the present invention.
Figure 5:
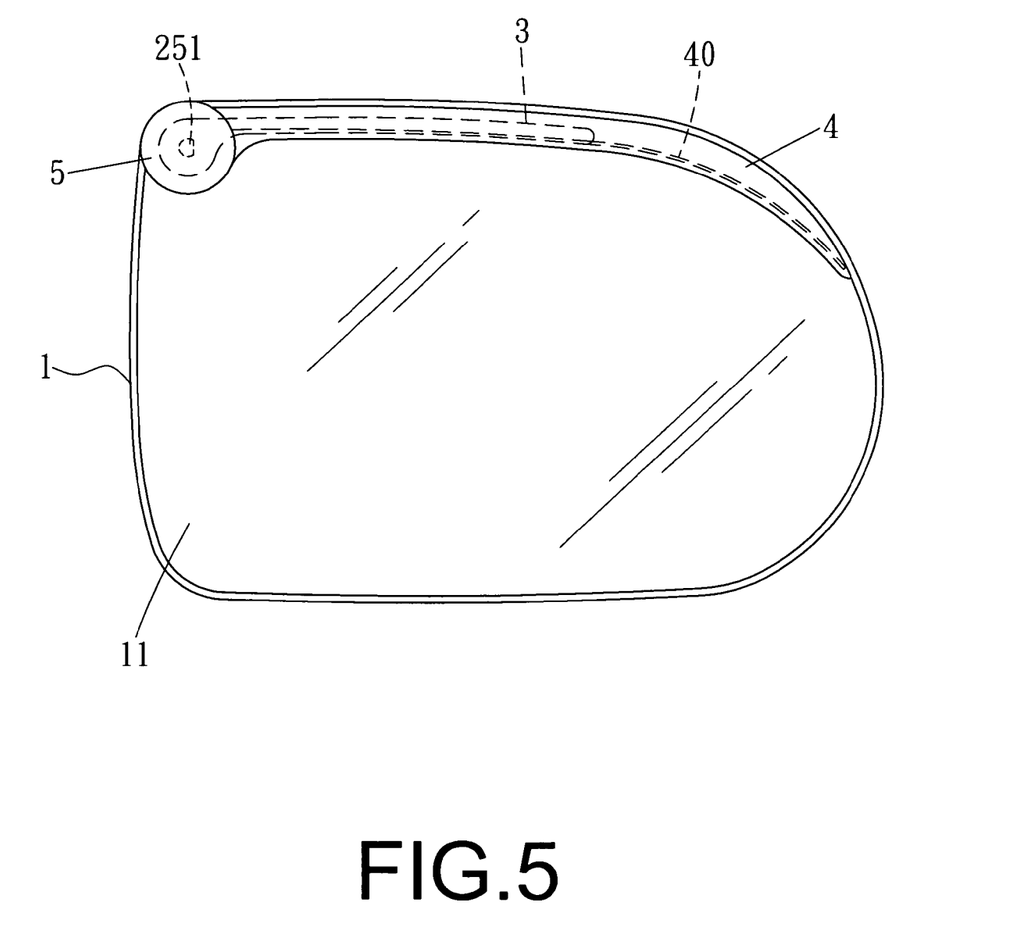
FIG. 5 is a front view of the wiper for an automobile rear-view mirror in a using condition in the present invention.

The wiper transmission device 2 installed at the rear side of the rear-view mirror 1 is composed of a base 20, a cover 21, a transmission motor 23, a speed-change gear unit 24 and a driven gear 25.

The base 20 is formed with an accommodating chamber 200 and provided in the interior with a bearing 201 with a shaft hole 202. The accommodating chamber 200 is disposed with a protruding stop block 203 and two recessed positioning holes 204 in the interior. The base 20 further has its outer circumferential edge disposed with a plurality of lugs 205 spaced apart and respectively bored with an insert hole 206.

The cover 21 to be covered on the base 20 is formed with an accommodating chamber 210 and has its outer circumferential edge fixed with plural lugs 211 spaced apart to match with the lugs 205 of the base 20 and respectively having an insert hole 212. A plurality of locking bolts 22 are respectively inserted through the insert holes 212 of the cover 21 and the insert holes 206 of the base 20 and firmly screwed with the threaded holes 13 at the rear side of the rear-view mirror 1 for fixing the base 20 on the rear side of the rear-view mirror 1. The cover 21 is fixed with a motor holder 213 having its inner side bored with an insert hole 214 communicating with the accommodating chamber 210, which is bored with two recessed positioning holes 215 in the inner side.

The transmission motor 23 is nearly half received in the motor holder 213 of the cover 21 and has its rotating shaft fixed thereon with a driving gear 230 inserted through the insert hole 214 in the inner side of the motor holder 213 and then positioned in the accommodating chamber 210 of the cover 21.

The speed-change gear unit 24 is installed in the accommodating chambers 200 and 210 of the base 20 and the cover 21, having two support shafts 240 respectively fitted thereon with plural different-sized gears engaged with each other. The two support shafts 240 have one end respectively inserted and positioned in the two recessed positioning holes 204 of the base 20 and the other end respectively positioned in the two recessed positioning holes 215 of the cover 21. A first gear 241 of the speed-change gear unit 24 is engaged with the driving gear 230 of the transmission motor 23.

The driven gear 25 is positioned in the accommodating chamber 200 of the base 20 and engaged with a second gear 242 of the speed-change gear unit 24. The driven gear 25 is provided with a projecting block 250 and fitted thereon with a rotating shaft 251 inserted through both the shaft hole 202 of the bearing 201 and the insert hole 12 of the rear-view mirror 1. The rotating shaft 251 of the driven gear 25 has one side formed with a cut face 252 and has its outer end bored with an annular groove 253.

The connecting rod 3 is connected with the rotating shaft 251 of the driven gear 25 and positioned on the front side of the rear-view mirror 1. The connecting rod 3 is bored with a shaft hole 30 having a same-shaped cross section as the cut face 252 of the rotating shaft 251 of the driven gear 25 for the rotating shaft 251 to be inserted and positioned stably therein.

The wiper 4 fitted on the connecting rod 3 is made of soft material and provided with an elastic strip 40 in the interior so that when the wiper 4 is swayed and has its end pushing against the edge of the mirror surface 11, the outer end of the wiper 4 will be elastically pressed to become curved. The outer end portion of the wiper 4 closely contacts with the surface 11 of the rear-view mirror 1.

The positioning member 5 is fixed at one side of the connecting rod 3 and firmly fitted on the outer end of the rotating shaft 251 of the driven gear 25. The positioning member 5 is bored inside with a recessed hole 40 having a projecting ring 51 secured in the interior to be engaged in the annular groove 253 of the rotating shaft 251 of the driven gear 25 for fixing one end of the connecting rod 3 on the rotating shaft 251 of the driven gear 25, thus finishing assembly of the wiper for the rear-view mirror 1.

Figure 6:
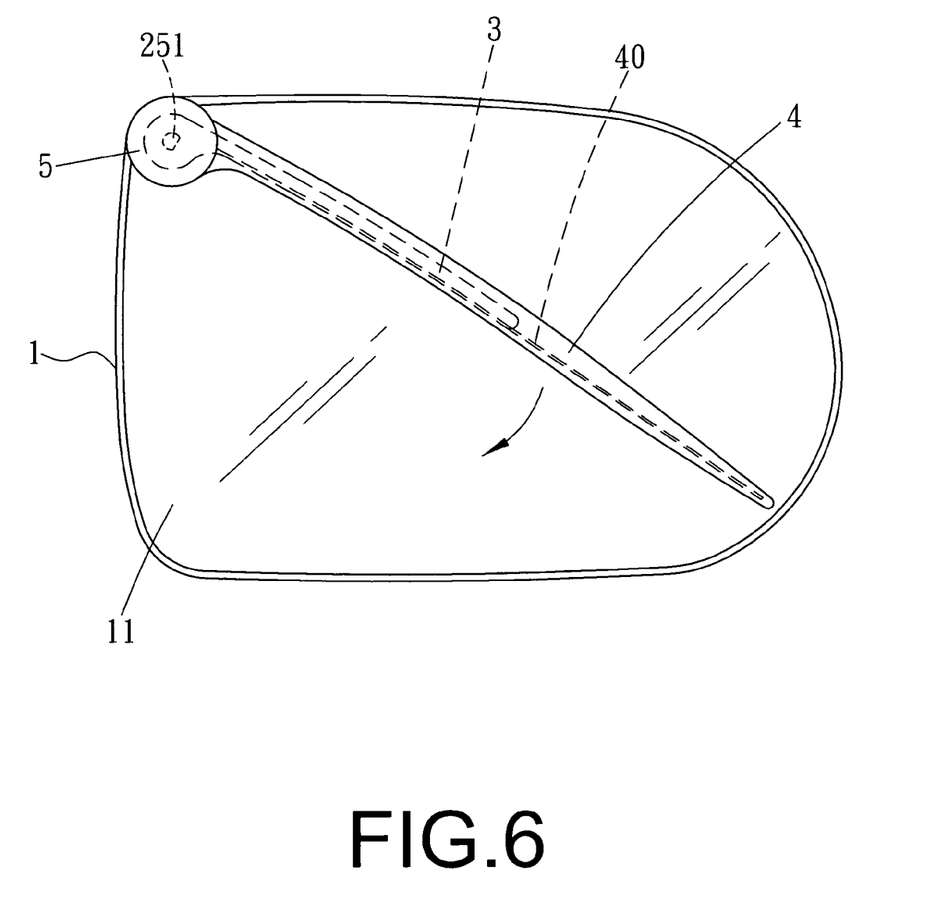
FIG. 6 is another front view of the wiper for an automobile rear-view mirror in a using condition in the present invention.
Figure 7:
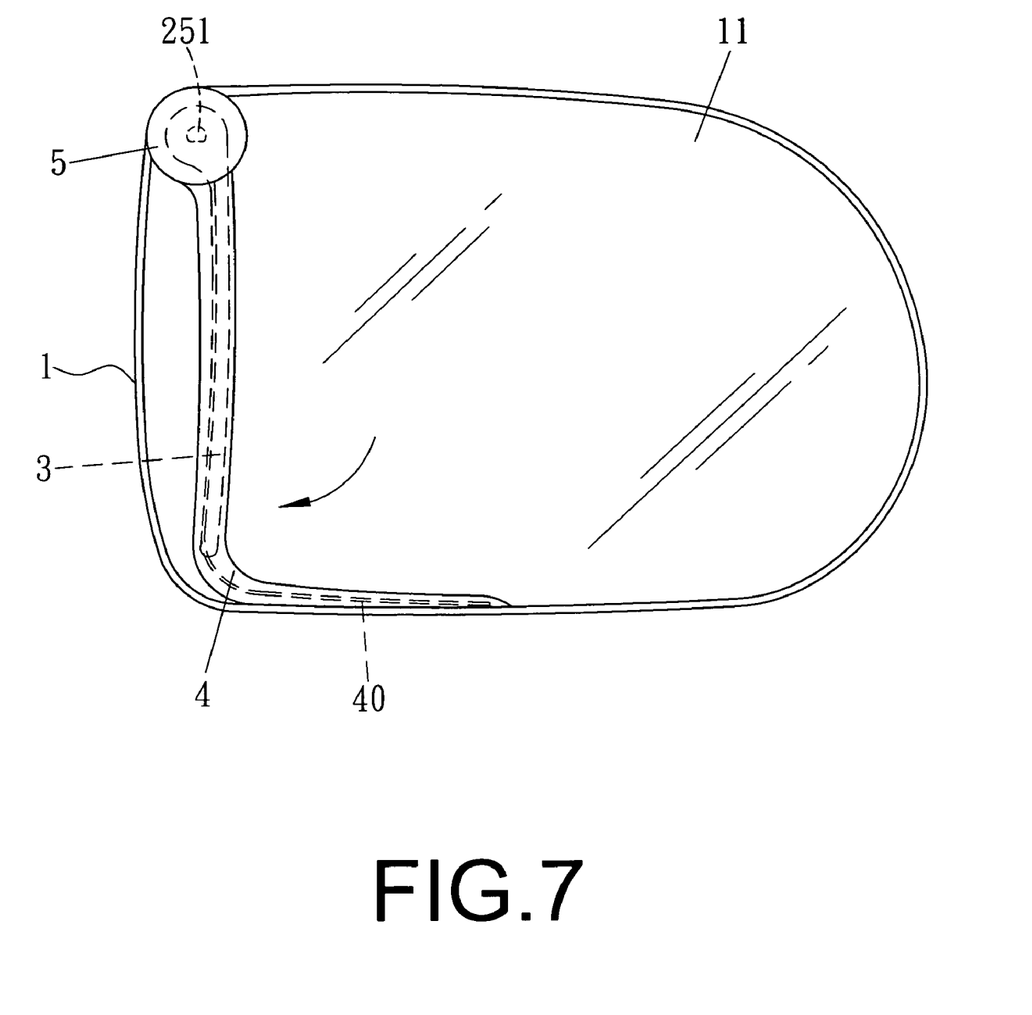
FIG. 7 is a third front view of the wiper for an automobile rear-view mirror in a using condition in the present invention.

To wipe out rain water on the surface 11 of the rear-view mirror 1, as shown in FIGS. 3-7, simply start the transmission motor 23 of the wiper transmission device 2 to operate and drive the driving gear 230 and the gear 241 of the speed-change gear unit 24, which is engaged with the driving gear 230, to rotate together to obtain rotating speeds required through transmission and variable speeds of mutually engaged gears of the speed-change gear unit 24. Simultaneously, another gear 242 of the speed-change gear unit 24 will drive the engaged driven gear 25 to rotate and have its rotating shaft 251 actuating the connecting rod 3 and the wiper 4 to sway upward or downward. At this time, the wiper 4, with the rotating shaft 251 acting as a pivot, will be swayed accurately on the surface 11 of the rear-view mirror 1. Since the wiper 4 is made of soft material and provided with an elastic strip 40 in the interior; therefore, when the wiper 4 is driven to sway and touch the lower edge of the surface 11 of the rear-view mirror 1, the outer end of the wiper 4 will be pressed bent along the inner edge of the mirror surface 11 and the elastic strip 40 inside the wiper 4 will be in an elastically curved condition, as shown in FIG. 7. When the rotating shaft 251 of the driven gear 25 drives the wiper 4 to sway downward and touch the lower edge of the mirror surface 11, the projecting block 250 of the driven gear 25 will resist against one end of the stop block 203 in the accommodating chamber 200 of the base 20, letting the rotating shaft 251 unable to rotate any longer. At this time, the transmission motor 23 continues to rotate and its torsional force increases, and after the torsional force is enlarged, the transmission motor 23 will stop operating in the original direction and then will operate reversely to drive the rotating shaft 251 of the driven gear 25 to rotate reversely and actuate the wiper 31 to sway upward. When the wiper 4 is driven to sway upward, the elastic strip 40 inside the wiper 4 is no longer pressed by the edge of the rear-view mirror 1 and will elastically recover to become straight for wiping the water drops on the mirror surface 11, as shown in FIG. 6. When the wiper 4 is swayed upward to a horizontal position (to the upper edge of the rear-view mirror 1), the projecting block 250 of the driven gear 25 will resist against the other end of the stop block 203 inside the accommodating chamber 200 of the base 20 to make the rotating shaft 251 of the driven gear 25 unable to be rotated. After the torsional force of the transmission motor 23 is enlarged again, the transmission motor 23 will stop operating in original direction and then will operate reversely to actuate the wiper 4 to sway downward for wiping out water drops on the mirror surface 11. By so designing, the wiper 4 can be driven to sway back and forth on the mirror surface 11, and the wiping surface 41 of the wiper 4 can function to clean up the water drops on the mirror surface 11 to keep the mirror surface 11 clear so as to enable a driver to clearly watch the traffic conditions reflected in the rear-view mirror 1 and drive with safety.

While the preferred embodiment of the invention has been described above, it will be recognized and understood that various modifications may be made therein and the appended claims are intended to cover all such modifications that may fall within the spirit and scope of the invention.

What is claimed is:

1. A wiper for an automobile rear-view mirror comprising a rear-view mirror, a wiper transmission device, a connecting rod, a wiper and a positioning member; wherein the rear-view mirror has a front side provided with a mirror surface which has an upper corner bored with an insert hole extending through a rear side of the rear-view mirror, and the rear side of the rear-view mirror is bored with a plurality of threaded holes;

the wiper transmission device installed at the rear side of the rear-view mirror is composed of a base, a cover, a transmission motor, a speed-change gear unit and a driven gear;

the base is formed with a first accommodating chamber and an interior thereof has a bearing with a shaft hole; the first accommodating chamber is disposed with two recessed positioning holes in the interior; the base further has an outer circumferential edge disposed with a plurality of lugs spaced apart and respectively bored with an insert hole;

the cover to be covered on the base is formed with a second accommodating chamber and has an outer circumferential edge fixed with plural lugs spaced apart to match with the lugs of the base and respectively having an insert hole; a plurality of locking bolts are respectively inserted through the insert holes of the cover and the insert holes of the base and firmly screwed in the threaded holes at the rear side of the rear-view mirror for fixing the base on the rear side of the rear-view mirror; the cover is fixed with a motor holder having an inner side bored with an insert hole communicating with the accommodating chamber, which is bored with two recessed positioning holes in the inner side;

the transmission motor is nearly half received in the motor holder of the cover and has a rotating shaft fixed thereon with a driving gear inserted through the insert hole in an inner side of the motor holder and then positioned in the accommodating chamber of the cover;

the speed-change gear unit is installed in the first accommodating chamber of the base and the first accommodating chamber of the cover, having two support shafts respectively fitted thereon with plural different-sized gears engaged with each other; each of the two support shafts has one end respectively inserted and positioned in the recessed positioning hole of the base and a further end positioned in the recessed positioning hole of the cover; a first gear of the speed-change gear unit is engaged with the driving gear of the transmission motor;

the driven gear is positioned in the first accommodating chamber of the base and engaged with a second gear of the speed-change gear unit; the driven gear is provided with a rotating shaft inserted through both the shaft hole of the bearing and the insert hole of the rear-view mirror;

the connecting rod is connected with the rotating shaft of the driven gear and positioned on the front side of the rear-view mirror; the connecting rod is bored with a shaft hole for the rotating shaft to be inserted and positioned stably therein;

the wiper fitted on the connecting rod is made of soft material and provided with an elastic strip in the interior so that when the wiper is swayed and has an end pushing against an edge of the mirror surface, an outer end of the wiper is elastic and capable of being curved; the outer end of the wiper closely contacts with the surface of the rear-view mirror; and the positioning member is fixed at one side of the connecting rod and firmly fitted on an outer end of the rotating shaft of the driven gear;

the positioning member is bored inside with a recessed hole having a projecting ring secured in an interior for fixing one end of the connecting rod on the rotating shaft of the driven gear, thus finishing assembly of the wiper for the rear-view mirror.

2. The wiper for an automobile rear-view mirror as claimed in claim 1, wherein the driven gear is provided with a projecting block and fitted thereon with the rotating shaft.

3. The wiper for an automobile rear-view mirror as claimed in claim 1, wherein the first accommodating chamber is disposed with a protruding stop block.

4. The wiper for an automobile rear-view mirror as claimed in claim 1, wherein the rotating shaft of the driven gear has one side formed with a cut face and the shaft hole having a same-shaped cross section as the rotating shaft of the driven gear at the cut face for the rotating shaft to be inserted and positioned stably therein.

5. The wiper for an automobile rear-view mirror as claimed in claim 1, wherein the rotating shaft of the driven gear has an outer end bored with an annular groove; and the projecting ring is engaged in the annular groove of the rotating shaft of the driven gear.

* * * * *